UNITED STATES PATENT OFFICE.

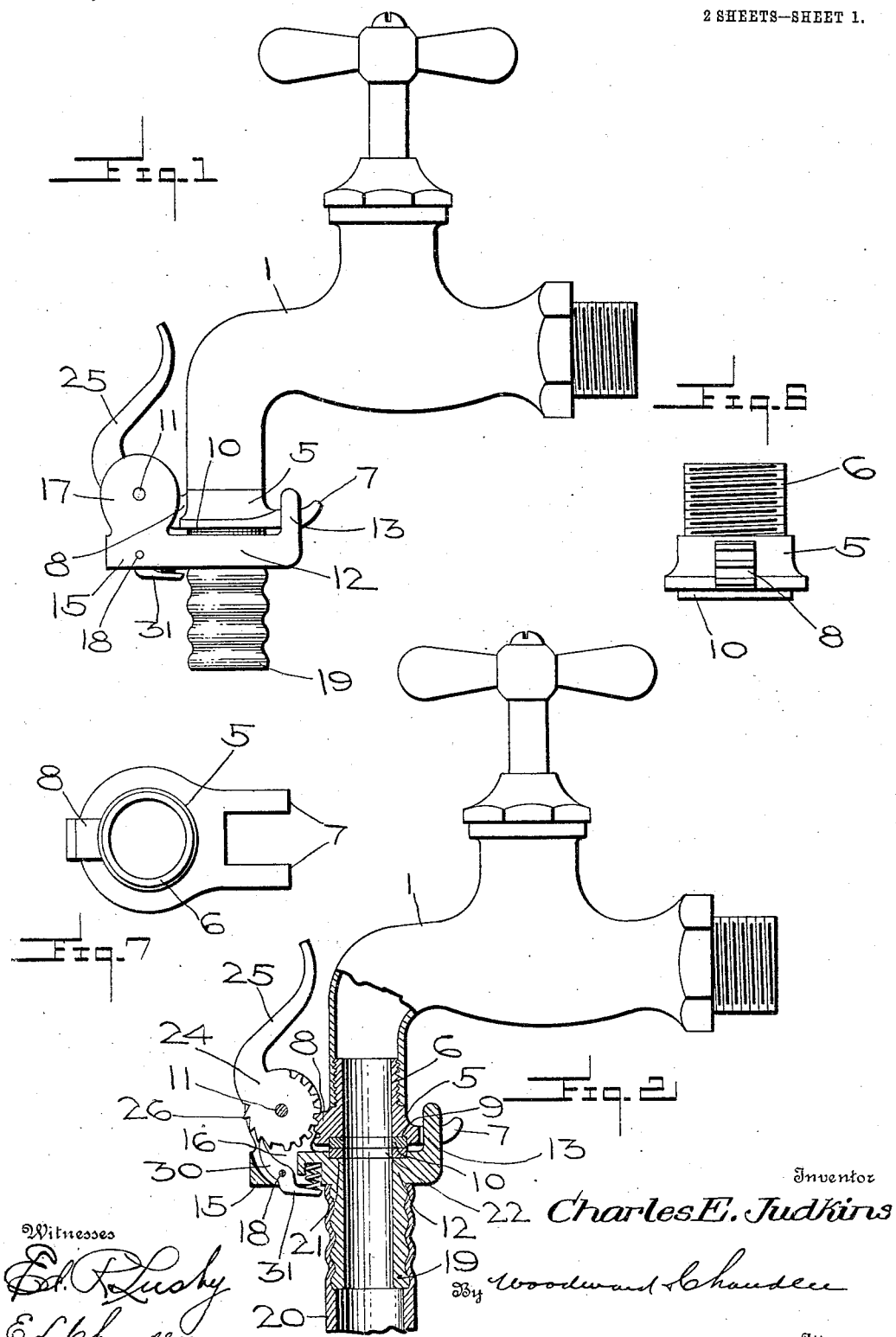

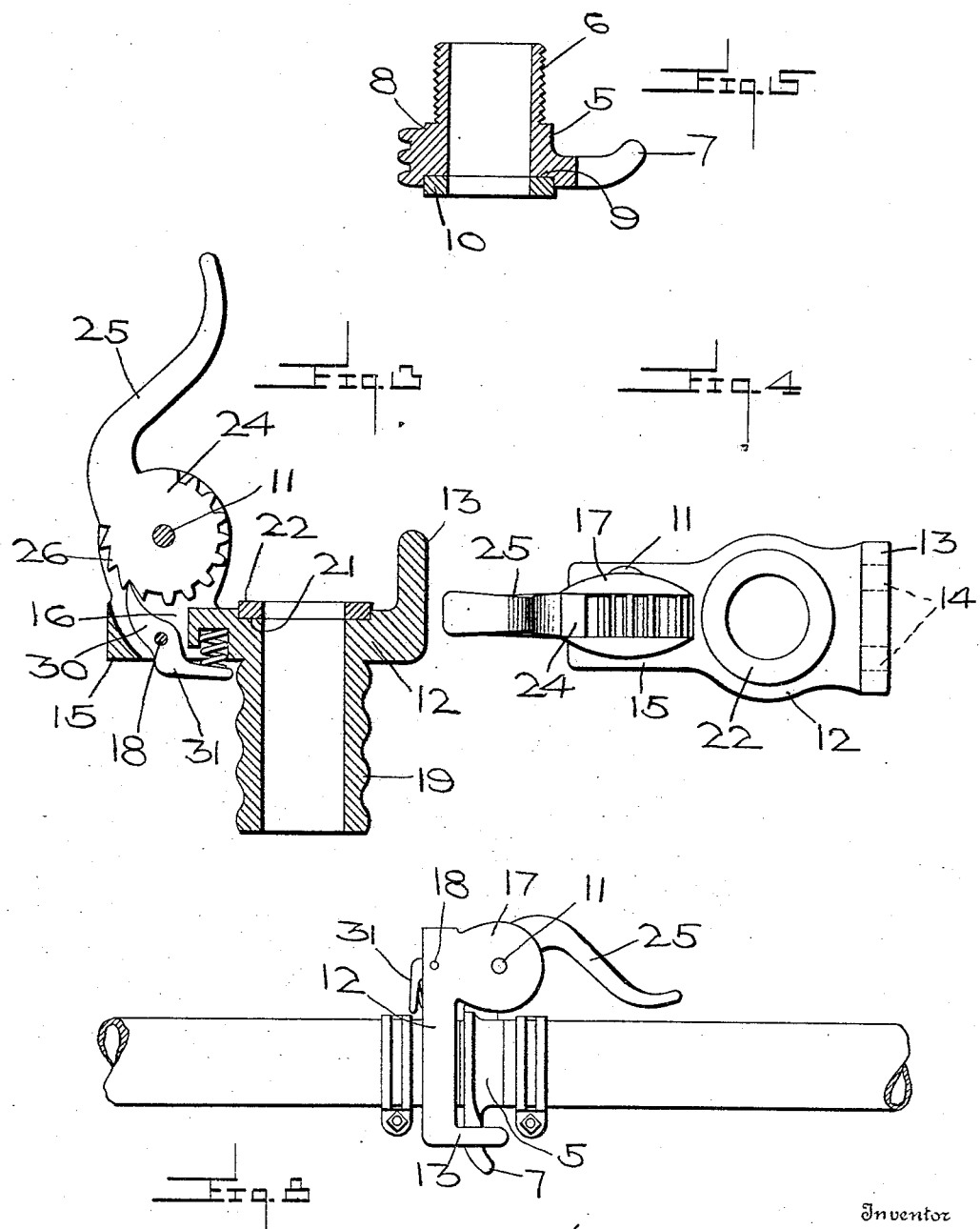

CHARLES E. JUDKINS, OF COEUR D'ALENE, IDAHO.

HOSE-COUPLING.

943,416.  Specification of Letters Patent.  Patented Dec. 14, 1909.

Application filed March 23, 1909. Serial No. 485,276.

*To all whom it may concern:*

Be it known that I, CHARLES E. JUDKINS, a citizen of the United States, residing at Coeur d'Alene, in the county of Kootenai and State of Idaho, have invented certain new and useful Improvements in Hose-Couplings, of which the following is a specification.

This invention relates to certain new and useful improvements in hose couplers.

The object of my invention is, to provide a simply constructed hose coupling, which is arranged so that the interlocking members may be united with ease, despatch and accuracy.

With these and other objects in view, the said invention consists in the combination and arrangement of parts as will be hereinafter more fully described, and particularly pointed out in the appended claims, it being understood that changes in the specific structure shown and described may be made within the scope of the claims, without departing from the spirit of the invention.

In the drawings forming a part of this specification, and in which like numerals of reference indicate similar parts in the several views, Figure 1 is a side elevation of a coupling embodying my invention secured to an ordinary water bib, Fig. 2 is a central sectional view through Fig. 1, Fig. 3 discloses a detached detail of the shackle members, as used in my invention, Fig. 4 is a top view of said shackle member, Fig. 5 is a sectional detached detail of the male or carrying member, Fig. 6 is an end view, Fig. 7 is a top view of the carrier member, Fig. 8 shows an elevational view of one of my coupling members as secured to a hose section.

In outlying and suburban districts, where the residents cannot depend upon the immediate services of an organized fire department, it is quite essential that an ordinary garden hose, which is usually at hand, can be instantly secured to a water bib. Hose couplers, where the members are connected by means of a screw thread, are objectionable, in that the members must be accurately held in parallel relation before they can be secured, and in case the thread has been mutilated, a coupling is not possible. In my present invention, I overcome these objectionable features, in that I provide a coupler constructed so that the two members can be instantly connected, to form a positive union.

In carrying out the object of my invention, I construct what I term a male or carrying member, and a female or shackle member arranged to receive the carrying member.

In the drawings, 5 designates the annular head of the male member, which has an extending sleeve 6, arranged to be screwed or threaded into a water bib or faucet 1, as shown in Fig. 2. This head has the extending slightly curved supporting ears 7, extending laterally in one direction, while extending in the opposite direction, the head has the gear lug 8. Interiorly, I provide the head with an annular seat 9, to receive the rubber or other elastic gasket 10, which extends beyond the face of the head, as shown in Fig. 5.

While I have shown the sleeve 6 as being exteriorly threaded, it should be understood that the same may be interiorly threaded and screwed upon the spout of the bib instead of into same.

The female or shackle member, comprises the pinch collar 12, at one point having the upstanding flange 13, provided with the opening 14 arranged to receive the ears 7, and at a point immediately opposite the flange, the collar is projected to form the arm 15, having the recess 16, and the extending pin ears 17, within the apertures of which is held the pin 11, passing through these ears. Held within the recess 16 is the pawl pin 18. This pinch collar is also provided with a sleeve 19, which is fluted or ribbed, to more firmly receive the hose 20 connected thereto. The collar has an annular recess 21, to receive the rubber gasket 22, which projects beyond the face of the collar as is shown in Fig. 3.

Carried upon the pin 11, is the head 24, of the lever 25, this head being in the form of a gear-sector provided in addition with the ratchet teeth 26. The ears 7 are arranged to stride that portion of the flange 13 positioned between the ear openings 14, so that the relative position of the coupling members is accurately determined. Carried upon the pin 18, is the pawl 30, engaging the ratchet teeth 26, the end 31 of the pawl 30 resting below the pinch collar, as shown in Fig. 2.

The working effects are so arranged that when the female or shackle member has been connected to the male or carrying member, in placing the two faces of the coupling members in juxtaposition, the gear-sector will engage the gear lug 8. The lever 25 is then carried upward so that the two elastic gaskets are brought into frictional engagement, the gear head finally being held by the pawl 30. Such a connection can be instantly made. To unseat the members, the pawl 30 is tipped to release the head 24 when the lever can be thrown downward.

While I have shown the coupler as connected to a bib or faucet 1, it is of course understood that the coupler could be secured to another hose section, though in such a case it would be well to flute the sleeve 6 instead of providing same with a screw thread. So also could lead or iron pipe be connected by means of my coupler.

Where the coupling members are to be secured to a hose or pipe, each member is provided with a fluted sleeve 19, as shown in Fig. 3. Otherwise, however, the construction is exactly as has been above described in connection with the bib coupling.

A particular advantage is embodied in my invention, in that a coupling can be readily made, while a full head of water is passing through the coupling members.

Having thus described my said invention, what I claim as new and desire to secure by United States Letters Patent is:—

1. A coupler having in combination, a carrying member provided with a supporting ear and a gear lug, a shackle member having a flange provided with an opening to engage said ear and also carrying an ear, a lever pivotally secured to said last mentioned ear having a gear sector arranged to be brought into engagement with said gear lug, and a pawl carried by said shackle member arranged to engage said gear sector.

2. A coupler comprising a carrying member having an extended ear, and a gear lug, a shackle member having a flange provided with an opening to receive said ear, a lever provided with a gear sector pivotally secured to said shackle member, a pawl carried by said shackle member and engaging said gear sector, and a gasket carried by said last mentioned member.

3. A hose coupler having in combination, a carrying member provided with an annular seat, a supporting ear, and a gear lug, of a gasket within said seat, a shackle member having a recessed flange, a gasket seat and an ear, a gasket within said last mentioned seat, the recess within said flange being arranged to receive the ear of said carrying member, a lever pivoted to the ear of said shackle member, said lever having a head in the form of a gear sector arranged to mesh with said gear lug, and a pawl pivoted to said shackle member, and meshing with said gear head.

In testimony whereof I affix my signature, in presence of two witnesses.

CHARLES E. JUDKINS.

Witnesses:
ROBERT H. MUNCEY,
CAESAR MASINI.